United States Patent [19]

Engle

[11] 3,890,786
[45] June 24, 1975

[54] PNEUMATIC TO HYDRAULIC CONVERTER WITH PARKING BRAKE

[75] Inventor: Thomas H. Engle, Cape Vincent, N.Y.

[73] Assignee: General Signal Corporation, Rochester, N.Y.

[22] Filed: Aug. 31, 1973

[21] Appl. No.: 393,533

[52] U.S. Cl. ............... 60/547; 60/553; 60/590
[51] Int. Cl. ............................................. F15b 7/08
[58] Field of Search .......... 60/547, 582, 590, 553, 60/589; 137/113; 303/6 M; 188/351

[56] References Cited
UNITED STATES PATENTS

| | | | |
|---|---|---|---|
| 2,285,382 | 6/1942 | Goepfrich | 60/589 |
| 2,371,293 | 3/1945 | Hoof | 137/113 |
| 2,544,849 | 3/1951 | Martin | 60/590 |
| 2,942,423 | 6/1960 | Brand | 60/589 |
| 3,425,221 | 2/1969 | Canfield | 60/547 |
| 3,439,585 | 4/1969 | Heuera | 92/63 |
| 3,538,708 | 11/1970 | Salam et al. | 60/547 |
| 3,550,379 | 12/1970 | Cox, Jr. et al. | 60/547 |
| 3,564,849 | 2/1971 | Hurula et al. | 60/553 |
| 3,736,842 | 6/1973 | Valentine | 303/6 M |

Primary Examiner—Martin P. Schwadron
Assistant Examiner—H. Burks, Sr.
Attorney, Agent, or Firm—Pollock, Philpitt & Vande Sande

[57] ABSTRACT

A pneumatic to hydraulic converter for a hydraulically operated brake system having first fluid motor, a spring applied fluid released motor means, and a master hydraulic cylinder is disclosed. The converter is responsive to positive variations in fluid pressure to actuate the a first fluid motor means and the hydraulic cylinder. The spring motor means is responsive to reductions in fluid pressure in said second fluid motor to actuate the hydraulic master cylinder. A service brake application is made by pressurizing the first fluid motor means, while a parking brake application is made by venting the second fluid motor means.

10 Claims, 2 Drawing Figures

3,890,786

PNEUMATIC TO HYDRAULIC CONVERTER WITH PARKING BRAKE

FIELD OF THE INVENTION

The present invention is intended for use on rail vehicles. The majority of rail vehicles presently utilize a mechanical linkage system for transmitting a braking force from an air cylinder of a pneumatic braking system to individual brake shoes which are suspended adjacent the wheels of the rail vehicle. This conventional type of brake system cannot conveniently be used on the new light weight rail vehicles because of space and weight limitations.

In addition, the present invention relates to a combined brake arrangement which includes both pneumatically controlled and hydraulically applied friction brakes and a completely independent pneumatic control system for a hydraulic parking brake.

The conversion to hydraulic brakes utilizes pneumatic to hydraulic converters which are directly actuated by the pneumatic control system already present on the rail vehicle. Additionally, the present invention is intended for use on light weight rail vehicles which employ small hydraulic actuators and caliper type disc brakes in the friction braking system.

SUMMARY OF THE INVENTION

It is therefore an object of the present invention to provide a pneumatic to hydraulic converter for use with conventional systems to supply hydraulic braking fluid to relatively small light weight hydraulic brake units which obtain the necessary braking force through the use of high hydraulic pressure rather than mechanical linkages and lower pneumatic pressures. The present invention employs a combination of air and hydraulic pressure and slack adjustment means to insure close control of brake shoe clearance and fast response to the brake signal. The slack adjustment means is automatic and is intended for use in brake systems using a preselected spacing between the pads and the disc. It is another object of the present invention to utilize the automatic slack adjuster to conserve the amount of air required by the pneumatic control system to thereby reduce the consumption of air while maintaining the necessary force amplification. It is a further object of the present invention to provide a fail safe hydraulic converter which may be utilized with the pneumatic control system present on a rail vehicle.

It is another object of this invention to provide a greatly simplified hand brake in a pneumatic to hydraulic converter, the converter employs a first fluid motor means and a hydraulic cylinder to effect actuation of the service brakes. The hand brake portion of the converter employs a spring motor means which is restrained by a second fluid motor means during normal operation. To effect a service application of the brakes, the first fluid motor means is pressurized, thereby displacing the hydraulic cylinder and actuating the hydraulic friction brake actuators. If a parking brake actuation is desired, the spring motor means is actuated by venting or releasing the pressure in the second fluid motor means to allow the spring motor means to exert its force against the hydraulic cylinder.

It is a further object of the present invention to utilize an automatic slack adjuster such as that disclosed in my copending application U.S. Ser. No. 302,415 entitled "Hydraulic Slack Adjuster and Brake Circuits Therefore," the disclosure of which is incorporated herein by reference. This slack adjuster uses a second hydraulic piston which is reciprocably mounted within a stepped cylindrical bore. The hydraulic piston has differentially sized working faces, and stop means at either end of its reciprocal travel. Spring biased check valves are also employed in the hydraulic piston to provide for fluid transfer during slack adjustment.

DETAILED DESCRIPTION OF THE PREFERRED EMBODIMENTS

Figure 1:
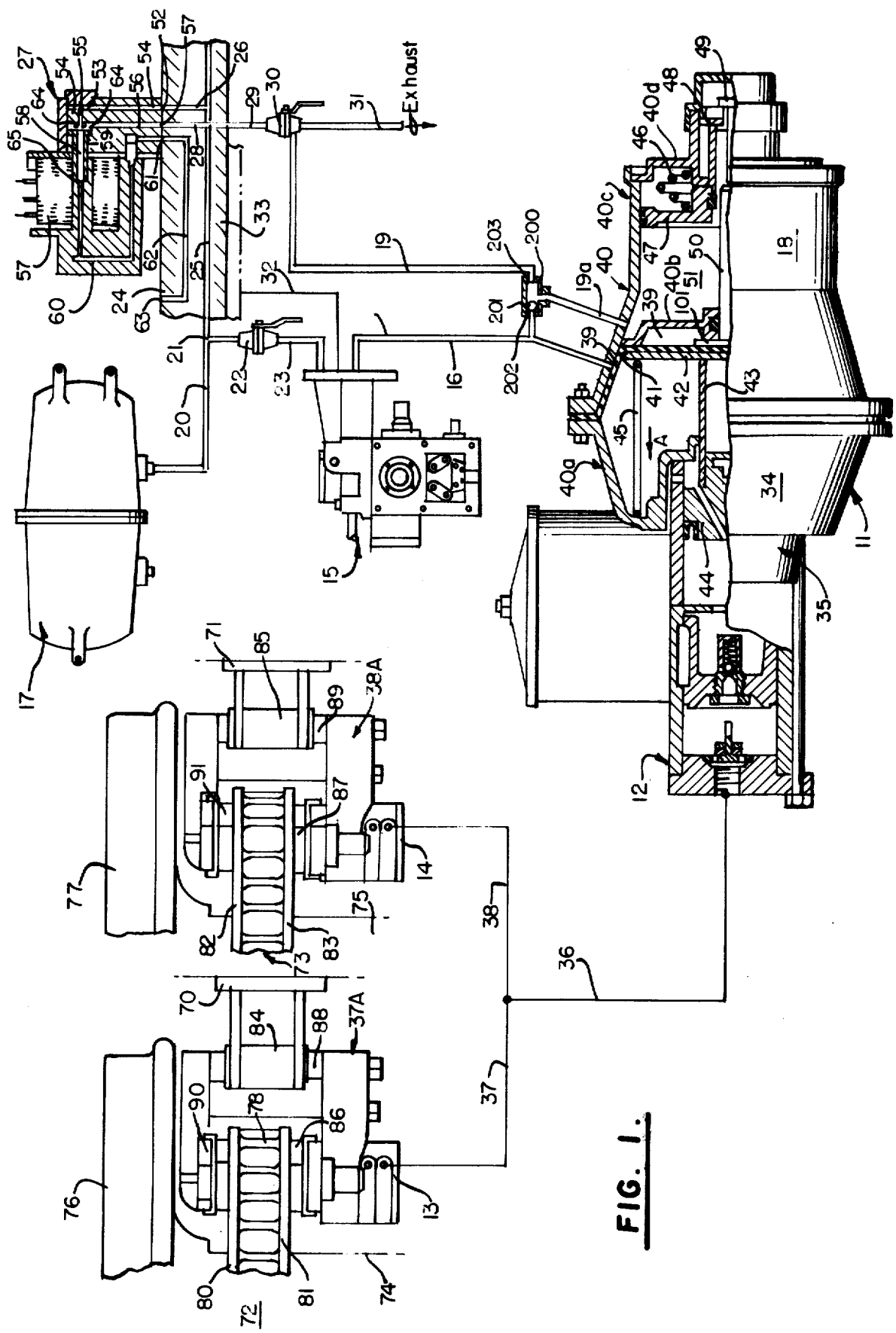
FIG. 1 is a diagrammatic and partially cross sectioned view of the pneumatic to hydraulic converter having a pneumatic control system and a hydraulic friction brake actuating system.

FIG. 1 is a diagrammatic and partially cross sectioned view of the pneumatic to hydraulic converter and its associated components. Disc brakes and hydraulic actuators provide the optimum braking system for mass transit or rapid transit vehicles. These brakes are operated much more frequently then conventional rail vehicles, since transit vehicles make a high number of stops per mile of travel. In addition, the braking systems must be relatively precise in order to avoid sudden stops or undue variations in the rate of vehicle deceleration. In addition, the small size of the actuators and the light weight of the hydraulic equipment provides a wide choice of design parameters in laying out the vehicle trucks.

In the brake system illustrated in FIG. 1, reservoir 17 provides air pressure for the pneumatic control system which operates the pneumatic to hydraulic converter 11. Air pressure in reservoir 17 is conveyed by conduit 20 to branch T 21 where a portion of the change is applied to the control means 15 through shut off cock 22 and conduit 23. The air pressure present in reservoir 17 is also supplied to a manifold means 24 including a supply passage 25 which provides air pressure to a handbrake system through air passageway 26. The handbrake release valve 27 provides a through connection between input passage 26 and output passage 28 when the parking brake or handbrake is released. Manifold output line 28 leads to conduit 29 and three way valve 30. Three way valve 30 communicates with the handbrake control line 19, and exhaust line 31.

The control valve 15 may be any one of several control valves currently in use. It receives an input pressure through conduit 23, and receives an input signal from line 32. Line 32 is diagrammatical, and could represent either an electrical control line, or a pneumatic control line depending upon the control valve actually used. Control line 32 receives its input signal from the control system 33. If the control system is electrical in nature, line 32 will represent one half of an electrical control circuit which originates and terminates in the electrical controller. If the control valve 15 is pneumatically operated, line 32 would represent a pneumatic line which provides variations in air pressure to operate control valve 15. Control valve 15 regulates the air pressure supplied from reservoir 17 to the pneumatic to hydraulic converter 11. This air pressure is transmitted from control valve 15 through conduit 16 to a first fluid motor portion 34. The pneumatic hydraulic converter 11 transmits the pneumatic control signals from controller 15 into hydraulic pressure by means of hydraulic master cylinder 35. The hydraulic pressure passes through a slack adjuster 12, and is conveyed by hydraulic lines 36, 37 and 38 to hydraulic actuators 13 and 14. These hydraulic motors operate a pair of caliper brakes 37A and 38A which apply the friction braking force for the vehicle.

Upon receiving the appropriate control signal from control system 33, the control valve 15 will supply air under pressure through conduit 16 to the first fluid motor chamber 39. This chamber is defined by the walls of casing 40 and flexible diaphragm member 41. The pressure in chamber 39 will drive diaphragm 41 and piston member 42 to the left as indicated by the arrow A in FIG. 1. Piston member 42 exerts pressure on push rod 43 which in turn drives the hydraulic piston 44 to supply hydraulic fluid under pressure to the slack adjuster 12. The output of the slack adjuster 12 is transmitted through hydraulic lines 36–38 to the hydraulic actuators 13–14.

When the control means 15 has received a signal to deenergize the friction brake system, it vents control line 16 to reduce the pressure in chamber 39. As the pressure in chamber 39 is reduced, spring member 45 returns piston 42 to its extreme right hand position as illustrated in FIG. 1.

Hydraulic actuators 13 and 14 may also be operated by the handbrake system. This system comprises a spring applied fluid released motor means having a fluid motor means 18, spring motor means 46, and handbrake control means 27 and 30. The spring motor means 46 normally applies a constant bias against piston member 47 which is connected to piston 42 and push rod 43 by means of piston extension 48, lead screw 49, push rod 50, and pressure plate 106. Piston member 47 is normally restrained by the second fluid motor means 18 by virtue of the pressure maintained in chamber 51. The pressure in chamber 51 is supplied from the auxiliary reservoir 17 through hand brake release valve 27 and three-way valve 30.

The pneumatic to hydraulic converter comprises first and second pneumatic motors 34 and 18, a hydraulic master cylinder 35, and a hydraulic slack adjuster 12. The converter is responsive to positive variations in fluid pressure in the first fluid master cylinder means to actuate the hydraulic motor 35 and the slack adjuster 12. The spring motor means 46 in the parking brake section is responsive to reductions in fluid pressure in the second motor means 18 to actuate the hydraulic piston 44 and the hydraulic slack adjuster 12.

The control system for the hand brake or parking brake comprises the release valve 27, 3-way valve 30, and two-way check valve 200. The release valve and the three-way valve are capable of venting the motor chamber 51 to effect an actuation of spring piston means 46 and hydraulic motor 44. Air pressure from auxiliary reservoir 17 is supplied to chamber 51 through manifold passageway 25, input passageway 26, release or vent valve 27, output passage 28, conduit 29, three-way valve 30, conduit 19, and two way check valve 200. This valve is positioned between the supply conduit 16 which supplies the first fluid motor and conduit 19. The valve supplies the greater of the two pressures present in conduits 16 or 19 to conduit 19a and the second fluid motor.

The hand brake release valve 27 is normally biased in the position illustrated in FIG. 1, and must be energized to be released. Under normal circumstances, incoming pressure from manifold line 26 enters the release valve through inlet port 52 and passes to the cylindrical inlet chamber 53 by means of interior passageway 54. Cylindrical chamber 53 is connected with a similar cylindrical output chamber 54 by means of axial passageway 55. The air pressure then normally flows through outlet passageway 56 to the outlet port 57 and manifold line 28.

The release valve also comprises an electromagnet means 57 and a magnetically responsive piston portion 58. Piston member 58 cooperates with its axial bore to provide an annular passageway 59. Release valve 27 also defines an exhaust passageway 60 and an exhaust port 61 which is connected to a manifold exhaust line 62 and atmospheric exhaust port 63.

When release valve 27 is energized, piston member 58 moves to the right as illustrated in FIG. 1 and engages valve seat 64 which surrounds the axial passageway 55. At the same time, movement to the right unseats the piston from valve seat 65 which surrounds the exhaust passageway 63. Once piston member 58 has been driven to the right, it closes communication between inlet passageway 54 and outlet passageway 56, and opens communication between outlet passageway 56, coaxial passageway 59, and exhaust passageway 60. Piston 58 and valve seat 64 serve to close communication between the exhaust passageway 60 and the inlet passageway 54 to prevent exhausting the air pressure present in reservoir 17 through conduit 20, manifold line 25, inlet manifold line 26, and exhaust passageway 62.

The actuation of release valve 27 and piston 58 also provides a communication between the exhaust port 63 and motor chamber 51. This exhaust communication is through conduit 19 and 29, outlet line 28, outlet passageway 56, coaxial passageway 59, exhaust passageway 60, exhaust port 61, and manifold exhaust line 62, and exhaust port 63. As the air pressure in motor chamber 51 is exhausted, spring means 46 will drive piston member 47 to the left as illustrated in FIG. 1, energizing the hydraulic master cylinder 35 and effecting an application of the hydraulic brake actuators 13 and 14.

The two way check valve is essentially a limiting device intended to limit the total amount of pressure presented to the hydraulic master cylinder 35. If both the hand brakes and the service brakes were to be applied in an emergency stop, the pressure from spring motor 46 would be added to the fluid pressure applied to chamber 39 by the service brakes. This would lock the wheels of the vehicle and result in a skid which would increase the stopping distance. The check valve ball 201 moves in response to pressure variations in conduits 16 and 19. Normally, the pressure in conduit 19 will move ball 201 to the left closing off communication with port 202 and conduit 16. Conversely, a higher pressure in conduit 16 will move ball 201 to the right, resulting in the closing of port 203.

In normal operation, the full brake pipe pressure of 70 would be maintained in reservoir 17 and conduit 19, with virtually no pressure present in service line 16. During normal sevice applications, the pressure from control valve 15 should never rise above the 70 psi in the handbrake control line 19, and the valve will remain as illustrated in FIG. 1.

If an emergency stop were made with both service and hand brake applications, valve 200 would function as follows. If the full service application was 50 psi, the pressure at inlet port 202 would be 50 psi, and that at port 203 would initially be at 70 psi. As the pressure in conduit 19 is released through release valve 27, the spring motor will overcome the dropping pressure in chamber 51 and will begin to move to the left. At the same time, as the pressure in conduit 19 drops below 50 psi, two-way check valve 200 will shift closing communication through port 203 and connecting chamber 51 with the service pressure present in conduit 16. The applied pressure will then be total amount of pressure exerted by spring motor 46. The total will equal the pressure in chamber 39, plus the "pressure" or force from spring motor 46, less the remaining pressure in chamber 51. Since the pressure in chamber 39 and 51 are now interconnected and equal, the brake application will be equivalent to the pressure generated by spring motor 46 acting on hydraulic master cylinder 35. This will be true whether the service application pressure increases or decreases. It will remain at full spring motor pressure until conduit 19 is repressurized above the service application pressure, at which point the valve 200 will again shift to the position illustrated in FIG. 1.

The use of the spring motor means 46 also permits the hand brake portion of the pneumatic to hydraulic converter to be used as a "last ditch" braking means. In the event of a pneumatic and electrical failure, the manual 3-way valve 30 may be turned from the configuration illustrated in FIG. 1, to a pass through configuration in which motor chamber 51 is allowed to exhaust through conduit 19 and exhaust passageway 31. The manual three-way valve 30 may also be used for normal parking applications, and is therefore equipped with a valve seat to close conduit 29 when conduit 19 is connected to exhaust passageway 51. This prevents an undesirable loss of air pressure from auxiliary reservoir 17.

As indicated previously, hydraulic actuators 13 and 14 operate a pair of caliper brakes 37A and 38A. These brakes are supported from the vehicle trucks by means of support means 70 and 71 and exert a braking force on brake discs 72 and 73. These discs are securely attached to axles 74 and 75 of vehicle wheels 76 and 77. The discs are segmented to permit assembly on the vehicle axle without pulling a wheel from an axle. The two segments lock together mechanically, and are designed so that they cannot be incorrectly assembled. The two segments are matched and balanced as a set. Venting is provided with radial ribs, illustrated at 78 and 79 which separate the two friction surfaces (80 and 81 for discs 72; 82 and 83 for disc 73). These ribs also act as sorroco-type blowers which move a large quantity of air through the discs to provide rapid cooling between stops. The caliper brakes 37A and 38A are of the floating type which slide in bushings 84 and 85 to follow the discs 72 and 73 during the brake application. The hydraulic actuators 13 and 14 are located on only one side of the disc but apply pressure to both sides of the disc through the caliper action. As the hydraulic actuators 13 and 14 apply pressure to disc brake pads 86 and 87, the calipers slide on pins 88 and 89 through bushings 84 and 85 to bring disc pads 90 and 91 into contact with the disc faces 80 and 82. The caliper pins 88 and 89 and bushings 84 and 85 permit the caliper to "float", thereby reducing drag as well as following the lateral movement of the assembly relative to the disc.

Figure 2:
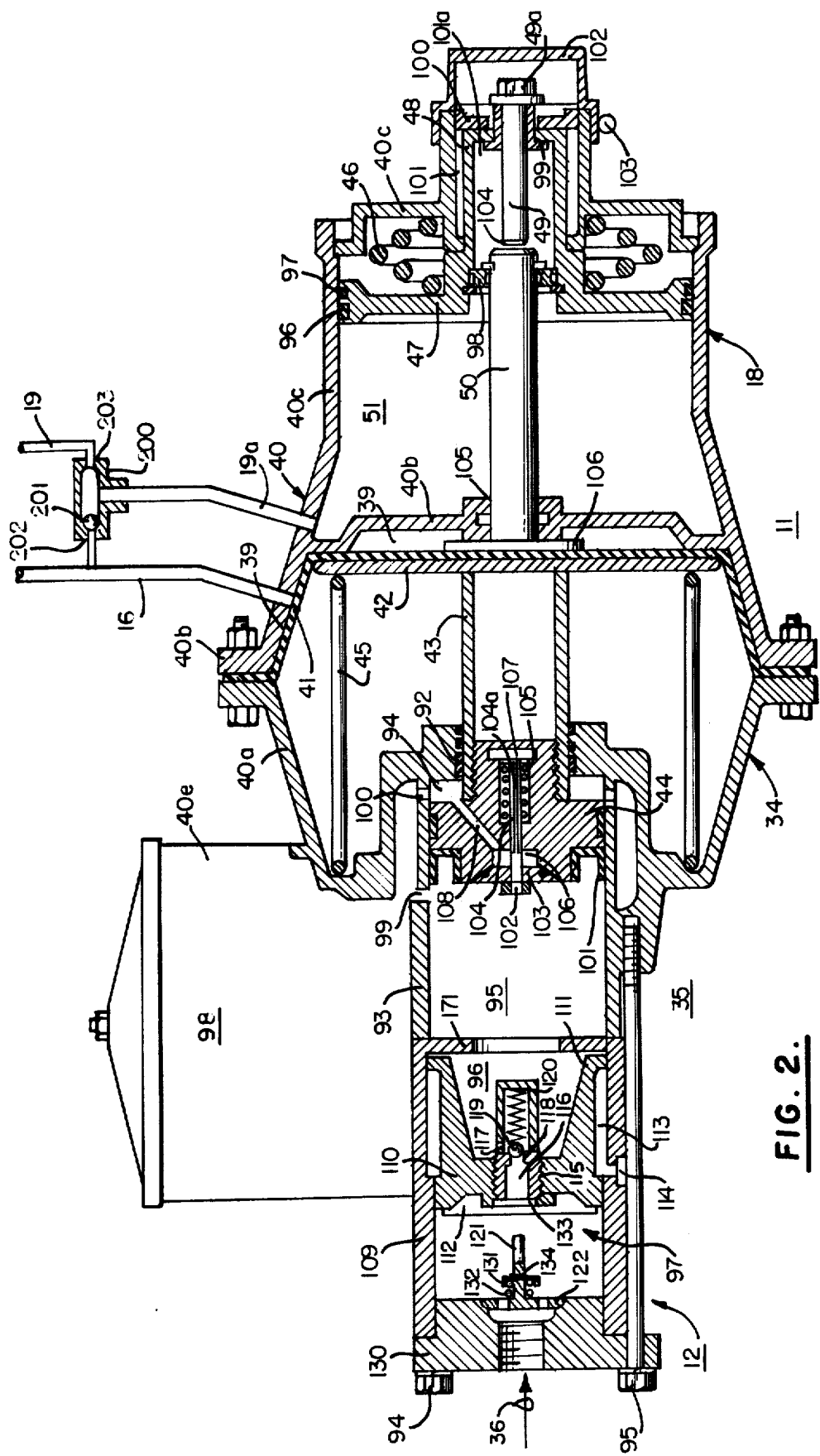
FIG. 2 is a cross sectional view of a pneumatic to hydraulic converter illustrating the first and second fluid motor means, the spring motor means, the hydraulic master cylinder, and the slack adjuster of the present invention.

FIG. 2 is a detailed cross sectional drawing of the pneumatic to hydraulic converter, the hydraulic master cylinder 35, and the slack adjuster 12. The converter generally comprises a casing member 40 which defines a first fluid motor 34 with a generally frusto-conical casing member 40a, and a base member 40b (which also defines an intermediate wall between the first fluid motor 34 and the second fluid motor 18). The second fluid motor 18 is housed within a cylindrical barrel portion 40c which has intermediate wall 40b on one end and end cap 40d on the other. The converter also comprises a hydraulic fluid reservoir 40e which may or may not be integral with the casing which forms member 40a.

The various members of the casing 40a – 40e are bolted together to form first and second fluid motor chambers, and a chamber for the spring motor means 46. The first fluid motor comprises a diaphragm 41, a fluid motor chamber 39, and a piston member 42. Piston member 42 is mounted on push rod 43 which is reciprocably journaled in casing 40a by the bushing means indicated at 92. Push rod 43 is securely attached to the hydraulic piston 44 which is mounted for reciprocation within cylinder 93. Cylinder 93 and the slack adjuster 12 are mounted to the casing 40 by means of bolts 94 and 95. The hydraulic cylinder 93 also defines working spaces 94 and 95 on either side of hydraulic piston 44.

The converter also defines a second fluid motor 18 having a piston member 47 which is mounted for reciprocation within cylinder 40c on piston rider 96. This rider may be formed of a phenolic resin or teflon or any one of a variety of durable and resilient seal materials. Piston member 47 is also mounted for reciprocation on push rod 50 and is sealed as indicated at 97 and 98 to prevent excessive leakage from chamber 51. Piston member 47 has a laterally extending extension member 48 which is long enough to encompass the entire length of push rod 50, and the reciprocable travel of piston member 47. Piston member 47 is normally firmly engaged against push rod 50 by means of lead screw 49, threaded insert means 99, and spring motor means 46. A secondary rider 100 is provided for reciprocation within chamber 101 to ensure axial stability of piston 47 and lead screw 49. An endcap 102 is secured to end wall 40c by means of clamp 103 to prevent the entry of dust, dirt and other debris.

Lead screw 49 is normally in abutment with push rod 50 as indicated at 104. Push rod 50 is reciprocably mounted within interior wall 40b as indicated at 105 and is supported by the journalled opening 105 and piston 47. Push rod 50 also defines a pressure plate 106 which transmits the pressure exerted on push rod 50 to the diaphragm 41 and piston 42.

In operation the chamber 51 is vented and spring member 46 will exert a pressure to the left (as indicated in FIG. 2) on piston 47. This force is transmitted through piston extension 48 and insert 99 to the lead screw 49. Lead screw 49 in turn transmits the spring force to push rod 50, pressure plate 106, piston 42, and push rod 43. This provides a positive actuation of hydraulic piston 44 when the pressure in chamber 51 is vented.

The extension 48, lead screw 49, and insert 99 are provided to allow a manual release of the parking brake after it has been applied. If the parking brake is applied when there is no additional air pressure present in auxiliary reservoir 17 to remove the parking brake, it may be released manually by means of lead screw 49. This release is accomplished in the following manner. After an application of the hand brake, piston 47, push rod 50, piston 42, push rod 43 and hydraulic piston 44 will be displaced to the left by an amount proportional to the pressure exerted by spring means 46, the volume of chamber 95, and the working surface of piston 44. After the force exerted by the spring motor means 46, and the back pressure developed by hydraulic actuators 13 and 14 have reached and equilibrium, pistons 47 and 42 will be suspended somewhere along their path of travel towards the extreme left hand limiting position. The parking brake may be released without pressurizing chamber 51 by removing end cap 102 and manually retracting lead screw 49 with a socket wrench. It should be understood that the hexagonal head 49a of lead screw 49 will be located within cavity 101. As the lead screw 49 is unwound, the spring means 46 will force piston member 47 to the left, maintaining a constant pressure on push rod 50. It will be necessary to continue to unwind or retract lead screw 49 until piston member 47 engages the intermediate wall 40b. At this point, only a small amount of retraction will be necessary since hydraulic fluid is substantially incompressible, and a relatively short retraction of lead screw 49 will result in a complete release of the hydraulic pressure in hydraulic actuator 13 and 14. Once piston member 47 has abutted intermediate wall 40b, and lead screw 49 is retracted, the spring means 45 will urge piston member 42 to the right, withdrawing hydraulic piston means 44. Thereafter, chamber 51 may be repressurized and lead screw 49 reset to provide for later, automatic parking brake application.

It should also be noted that the hydraulic brakes may be reapplied at this point by advancing lead screw 49 through threaded insert 99 causing the spring motor means 46 to exert a pressure on push rod 50 through piston member 47. This reapplication of the brakes through lead screw 49 may be made at any time the pressure in chamber 51 is vented.

The hydraulic master cylinder of the present invention includes a hydraulic piston 44, a hydraulic cylinder 93 and hydraulic working space 95. Hydraulic fluid is stored in reservoir 98 which is defined by external casing wall 40e. Hydraulic fluid enters the hydraulic cylinder space 95 through port 99 and working space 96 through port 100. Port 99 ensures that working space 95 is completely filled with hydraulic fluid at all times. Port 100 is used to transfer additional hydraulic fluid to working chamber 95 when a slack adjustment has been made by slack adjuster 12. This transfer of fluid during slack adjustment will be hereinafter explained.

Hydraulic master cylinder piston 44 also includes an annular sealing ring 101 to provide a working seal between the cylinder 93 and piston member 44. When hydraulic piston 44 advances to the left as illustrated in FIG. 2, it closes port 99 to prevent displacemtnt of hydraulic fluid back into reservoir 98. Piston member 44 includes a check valve generally indicated at 102 which includes a valve disc 103, a valve stem 104 and a light-weight helical biasing spring 105. Stem member 102 also includes a coaxial bore which interconnects space 106 with a counterbalancing space 107 immediately behind stem 102. Counterbalancing space 107 offsets the working pressure which would normally arise in proportion to the cross sectional area of stem 104. The passageway allows hydraulic fluid to transfer to the other end of stem 104 to counterbalance the pressure arising on the front or valve face of the stem. Hydraulic piston 44 also includes an internal angled passageway 108 which serves to transfer fluids from working space 94 through the piston and check valve 102 to hydraulic work space 95 when a fluid transfer is desired.

The slack adjuster unit 12 comprises a step cylinder 109 whose oppostie ends are closed by end cap 130 and an abutment means 171. The slack adjuster also comprises a differential area reciprocal piston means 110 which is formed with a first large diameter piston portion 111 and a second smaller diameter piston portion 112 which fit the corresponding portions of step cylinder 110. Piston means 110 divides cylinder 109 into a pair of working spaces 96 and 97, the space 96 at the larger diameter end of the cylinder being in continuous communication with working chamber 95 of the hydraulic booster. The chamber 97 is in continuous communication with the hydraulic actuators for the friction brake means. The intermediate portion of the cylinder, which includes the working space 113 is vented to atmosphere through port 114. The two working spaces 96 and 97 are normally isolated from each other, but under certain conditions, fluid can be transferred between the spaces through a cartridge type valve unit 115 which is threaded into an axial bore extending through piston 110. This valve unit comprises a transfer passage 116 and a radial transfer port 117 which are separated by valve seat 118 and ball valve 119. The ball valve is urged towards seat 118 by the hydraulic pressure in working space 96, and by compression spring 120. Check valve 119 may be unseated and shifted to its open position by means of excess pressure in space 97. The valve thereby performs a check valve or release function and allows flow from space 97 to space 96 when the pressure in the former exceeds the latter by a predetermined amount. In a typical case, spring means 120 is selected to permit opening of the valve upon development of the differential-pressure on the order of 12 psi.

Valve means 119 can also be unseated mechanically by a push rod 121 which is carried by spider 122 affixed to cover means 130. Push rod 121 is effective to open the valve just before piston 110 reaches the limits of its leftward travel, or approximately 1/16 of an inch before the piston abuts endcap 130. The stroke of piston member 110, and the respective volume in chamber 97 determines the clearance between the brake pads and discs.

When the pneumatic to hydraulic converter is in service, and the brakes are released, the components in converter 11, master cylinder 35 and slack adjuster 12 assume their illustrated positions. When a service brake application is initiated, the pneumatic control means 15 will deliver compressed air to working chamber 39 at a pressure representative of the desired braking effort, the diaphragm means 41 will move piston member 42, push rod 43 and piston member 54 to the left on a discharge stroke. The initial movement of the piston 44 will isolate port 99 from working space 97, so for all practical purposes, the hydraulic fluid displaced from the working space 95 exits into working space 96. As hydraulic pressure develops in working space 96, piston member 110 will be shifted to the left, and will displace hydraulic fluid from working space 97 to the hydraulic actuators 13 and 14. The actuators 13 and 14 power the caliper brakes 37 and 38 to apply the friction pads to disc brakes 72 and 73. If the pad clearance is less than that which slack adjuster 12 is designed to maintain, the pads will be moved into contact with the discs 72 and 73 before piston 110 reaches the limit of its leftward movement, and possibly after the piston is moved only a slight distance from its initial position. At this point, the pressure in working space 97 will rise above the pressure in space 96 as a result of the difference between the cross sectional areas of the piston portion 111 and 112. When the pressure differential reaches the setting determined by valve unit 115, ball valve 119 will be unseated and will permit flow of hydraulic fluid from chamber 97 into chamber 96 through the transfer passage 116. As a result, piston member 110 will be able to shift all the way to its limiting left hand position in immediate abutment with endcap 130.

Just before piston 110 abuts cover 130, push rod 121 will engage the spherical ball valve 119. As the piston abuts the endcap, valve 119 will be held open and hydraulic actuators 13 and 14 will be in direct communication with work space 95 of the pneumatic to hydraulic converter. The pressure developed in working chamber 95 and the hydraulic actuators 13 and 14 will be maintained proportional to the pneumatic command pressure initiated by control means 15 and presented to the pneumatic motor chamber 39.

When the sevice brake is released, the output pressure developed by control means 15 is dissipated, and spring means 45 will retract pistons 42 to thereby reduce the pressures in working space 95. Accordingly, brake cylinder pressure which prevails in space 97 will be effective to shift piston 110 to the right to effect closure of the ball valve 119. As the hydraulic piston 44 retracts and withdraws hydraulic fluid from working space 95, the slack adjuster piston 110 will shift back towards its initial position and effect transfer of hydraulic fluid from working space 96 to working space 95. These fluid transfers are effected by the combined actions of the suction created by the booster and the retraction forces exerted by the caliper brake means 37A and 38A.

In order to prevent an inadvertent transfer of fluid from hydraulic line 36 and chambers 97 to the working space 95 and 96, a second check valve 131 is included on push rod 121. This check valve comprises a disc 131 which is biased outwardly along push rod 121 by means of spring 132 which is mounted between disc 131 and spider 122. Valve disc 131 seals against the seat 133 defined within the check valve unit 115. Valve disc 131 is held in place on push rod 121 by means of a snap ring 134 which is located to maintain the valve disc 131 in a position to engage seat 135 just before the push rod 121 engages check valve 119. With this arrangement, the check valve disc 131 will always prevent flow from space 97 to space 96 whenever the ball valve 119 is held open by push rod 121. As a result, the pressure differential required to shift piston 110 back to its limiting right hand position will always be developed at the beginning of a brake release regardless of the rate at which the pressure in working space 95 is dissipated.

The resiliency of spring 132 is selected to provide a minimum amount of impedance for the transfer of fluid from working space 96 to working space 97 and hydraulic line 36 during slack adjustment.

The slack adjustment works in the following manner. In the first situation, increased wear on the friction pads has resulted in a shoe clearance which is initially greater than desired. In this situation, slack adjuster piston 110 will reach its left hand position abutting endcap 130 before the hydraulic actuators 13 and 14 have brought the pads into contact with disc 72 and 73. At this point, push rod 121 will unseat the spherical ball valve 119 so that additional hydraulic fluid required to take up the remaining shoe clearance, and to develop the desired level of braking force, can be transferred through valve means 115 and check valve 131. Since the brake application has caused piston 110 to move full stroke into engagement with endcap 130, it follows that the subsequent release of the service brake will cause piston 110 to withdraw from the hydraulic actuators 13 and 14 exactly the required quantity of hydraulic fluid. The volume of chamber 97 and the stroke of piston 110 id designed to effect a withdrawal of fluid establishing the proper clearance. Thus, it follows that if shoe clearance is initially too great, the slack adjuster 12 will reduce it to the desired value.

In the second situation, it is assumed that shoe clearance at the beginning of the application was too small, and that brake application was made before piston means 110 reached endcap 130. In this situation, a positive pressure differential will be developed between chamber 97 and 96 by reason of the differential area exerted on piston 110 by piston faces 111 and 112. This positive pressure differential is sufficient to unseat the spherical ball valve 119 in check valve 115 and allow the piston 110 to move to its extreme left hand position abutting endcap 130. In this application, push rod 121 will then continue to hold check valve 115 open and permit the hydraulic piston 44 to develop the required pressure in hydraulic actuators 13 and 14.

In each of the foregoing situations, the amount of hydraulic fluid returned to working space 95 and reservoir 98 must be altered. When shoe clearance initially is too great, the quantity of oil discharged from chamber 95 during the application will necessarily be greater than the quantity returned when the brakes are subsequently released. Therefore, during the release, the slack adjuster piston 110 will return to its initial position in contact with abutment means 171 before the hydraulic piston means 44 had reached its retracted position. In this situation, oil will be transferred from working space 94 through inclined passageway 108, and check valve 102 to working space 95 to ensure that hydraulic piston 44 will return to its retracted position. This design has a desirable side effect in that it affords to the designer a convenient way to control the degree of suction which the hydraulic booster applies to slack adjuster 12. Thus, in situations where it is desired to use the booster suction to augment the reaction forces acting on hydraulic actuators 13 and 14, the degree of assistance can be increased or decreased by merely reducing or increasing the diameter of passage 108 and the force or resiliency of spring means 45.

While I have thus described the preferred embodiments of the present invention, other variations will be suggested to those skilled in the art. It must be understood that the foregoing description is meant to be illus-

Having thus described my invention, I claim:

1. A pneumatic to hydraulic converter for actuating hydraulic brakes with a pneumatic control system comprising
   a. a first fluid responsive pneumatic motor means, said first pneumatic motor being responsive to positive variations in fluid pressure to actuate a first hydraulic master cylinder.
   b. a spring applied fluid released motor means restrained by a second pneumatic motor means, said spring motor means being responsive to reductions in fluid pressure in said second pneumatic motor to actuate said first hydraulic master cylinder.
   c. a hydraulic slack adjuster means, said adjuster means comprising a reciprocal piston with first and second working chambers on either side of said piston, said first working space communicating with said first hydraulic master cylinder, said second working space communicating with said hydraulic brakes, said slack adjuster means having first and second stop means for limiting the reciprocation of said piston,
   d. transfer valve means for permitting the transfer of hydraulic fluid from said first working space to said second working space when said piston abuts said first stop means, said valve also permitting the transfer of hydraulic fluid from said second working space to said first working space upon a predetermined differential in hydraulic pressure between said first and second spaces.

2. A pneumatic to hydraulic converter as claimed in claim 1 wherein said hydraulic master cylinder comprises a hydraulic piston member, said piston having a first hydraulic working portion mounted for reciprocation within a cylindrical member.

3. A pneumatic to hydraulic converter as claimed in claim 2 wherein said hydraulic piston member reciprocates from a first position in response to fluid pressure, and a hydraulic fluid supply means which communicates with ports defined by said cylindrical member on either side of said hydraulic piston when said piston is in its first position.

4. A pneumatic to hydraulic converter as claimed in claim 3 wherein said hydraulic piston member defines a passageway therethrough, said passageway being normally closed by a check valve during actuation of said piston member.

5. A pneumatic to hydraulic converter as claimed in claim 4 wherein said passageway is angled to the center axis of said piston adjacent said check valve.

6. A pneumatic to hydraulic converter as claimed in claim 1 wherein said spring motor means includes a pneumatically responsive piston which reciprocates within a cylindrical bore, said piston means being movable in one direction in response to fluid pressure and in another direction in response to spring motor pressure, said piston being adjustably coupled to said first fluid motor means and said first hydraulic master cylinder.

7. A pneumatic to hydraulic converter for actuating hydraulic brakes as claimed in claim 1 wherein said converter further comprises:
   a. first and second fluid entry points for said first fluid responsive pneumatic motor means and said spring applied fluid released motor means;
   b. a two-way check valve means interconnected between said first and second fluid entry points, whereby pressure directed to said first entry point is automatically directed to said second fluid entry point when the pressure in said first motor means exceeds the pressure in said second pneumatic motor means.

8. A pneumatic hydraulic converter as claimed in claim 1 wherein means are mounted adjacent said first stop means to open said spring loaded check valve when said piston abuts said first stop means, said piston having a larger effective area in communication with said first working space than with said second working space.

9. A pneumatic to hydraulic converter as claimed in claim 6 wherein said adjustable coupling comprises a push rod slidably mounted at one end within said piston and adapted at the other end to actuate said first motor means, an elongated housing attached to said piston and axially aligned with said push rod, said housing including threaded means for adjustably positioning said one end of said push rod along the axial length of said housing.

10. A pneumatic to hydraulic converter for actuating hydraulic brakes as claimed in claim 1, further comprising check valve means for preventing flow fo hydraulic fluid from the hydraulic brakes back through the slack adjuster when said slack adjuster piston abuts said first stop means.

* * * * *